(12) United States Patent
Zoch et al.

(10) Patent No.: US 8,914,565 B2
(45) Date of Patent: Dec. 16, 2014

(54) LOCKING OR LOADING AN OBJECT NODE

(75) Inventors: Daniel Zoch, Walldorf (DE); Henrik Saterdag, Bad Schonborn (DE); Renzo Colle, Stutensee (DE)

(73) Assignee: SAP AG, Walldorf (DE)

( * ) Notice: Subject to any disclaimer, the term of this patent is extended or adjusted under 35 U.S.C. 154(b) by 1379 days.

(21) Appl. No.: 11/760,223

(22) Filed: Jun. 8, 2007

(65) Prior Publication Data
US 2008/0307433 A1 Dec. 11, 2008

(51) Int. Cl.
*G06F 12/00* (2006.01)
*G06F 9/52* (2006.01)
*G06F 3/00* (2006.01)
*G06F 15/16* (2006.01)

(52) U.S. Cl.
CPC ........................................ *G06F 9/52* (2013.01)
USPC ................ 710/200; 719/315; 713/375; 707/8

(58) Field of Classification Search
USPC ................ 710/200; 719/315; 713/375; 707/8
See application file for complete search history.

(56) References Cited

U.S. PATENT DOCUMENTS

| | | | | |
|---|---|---|---|---|
| 5,063,503 | A * | 11/1991 | Jordan, Jr. ...................... | 710/200 |
| 5,226,037 | A * | 7/1993 | Satomi et al. .................. | 370/220 |
| 5,627,979 | A * | 5/1997 | Chang et al. ................... | 715/763 |
| 5,991,821 | A * | 11/1999 | Badovinatz et al. .......... | 719/310 |
| 6,182,186 | B1 * | 1/2001 | Daynes .......................... | 710/200 |
| 6,360,226 | B1 * | 3/2002 | Kim et al. ...................... | 707/102 |
| 6,477,597 | B1 * | 11/2002 | Sorace et al. .................. | 710/200 |
| 6,536,035 | B1 * | 3/2003 | Hawkins ........................ | 717/100 |
| 6,564,234 | B2 * | 5/2003 | Bamford et al. ............... | 707/203 |
| 6,594,683 | B1 * | 7/2003 | Furlani et al. .................. | 718/102 |
| 6,745,189 | B2 * | 6/2004 | Schreiber ........................ | 707/10 |
| 6,823,511 | B1 * | 11/2004 | McKenney et al. ............ | 718/102 |
| 6,965,893 | B1 * | 11/2005 | Chan et al. ......................... | 707/8 |
| 6,996,577 | B1 * | 2/2006 | Kiran et al. ................ | 707/103 R |
| 7,028,048 | B1 * | 4/2006 | Olsson ........................ | 707/103 R |
| 7,356,531 | B1 * | 4/2008 | Popelka et al. ................... | 707/8 |
| 7,496,909 | B2 * | 2/2009 | Kuch et al. ..................... | 717/158 |
| 2004/0039746 | A1 * | 2/2004 | Bracha .......................... | 707/100 |
| 2006/0123065 | A1 * | 6/2006 | Rapp .............................. | 707/201 |
| 2007/0185872 | A1 * | 8/2007 | Ho et al. ............................. | 707/8 |
| 2008/0034053 | A1 * | 2/2008 | Dasenbrock et al. .......... | 709/210 |

OTHER PUBLICATIONS

Ashok Joshi, Adaptive Locking Strategies in a Multi-node Data Sharing Environment, Digital Equipement Corporation, Sep. 1991.*

(Continued)

*Primary Examiner* — Paul R Myers
*Assistant Examiner* — Christopher A Daley
(74) *Attorney, Agent, or Firm* — Fish & Richardson P.C.

(57) ABSTRACT

A method includes receiving identification of an object that includes a plurality of nodes. The object is modeled to provide for association of any of the plurality of nodes into a lock group such that nodes of the lock group are locked together. Identification of a first group of the nodes to form the lock group is received. The method includes storing the object with the first group of the nodes forming the lock group. A method includes receiving identification of an object that includes a plurality of nodes. The object is modeled to provide for association of any of the plurality of nodes into a load group such that nodes of the load group are loaded together. Identification of a first group of the nodes to form the load group is received. The method includes storing the object with the first group of the nodes forming the load group.

19 Claims, 5 Drawing Sheets

(56) References Cited

OTHER PUBLICATIONS

"Shared Buffer for Goods Receipt Costing" [online]. SAP Library, [no date available], [retrieved on May 10, 2007]. Retrieved from the Internet: <URL: http://help.sap.com/saphelp_erp2005vp/helpdata/en/16/c9093a0c2e2974e10000000a11408 . . . .

"Buffer Distribution" [online]. SAP Library, [no date available], [retrieved on May 10, 2007]. Retrieved from the Internet: <URL: http://help.sap.com/saphelp_erp2005vp/helpdata/en/03/17111c3d3f11d5b6a6006094b9e9b . . . .

"Framework" [online]. SAP Library [no date available], [retrieved on May 10, 2007]. Retrieved from the Internet: <URL: http://help.sap.com/saphelp_erp2005vp/helpdata/en/43/433ae17e06601fe10000000a42203 . . . .

"Background Information" [online]. SAP Library [no date available], [retrieved on May 10, 2007]. Retrieved from the Internet: <URL http://heip.sap.com/saphelp_erp2005vp/helpdata/en/43/21fa3a4a032be8e10000000a1553f7 . . . .

* cited by examiner

LOCKING OR LOADING AN OBJECT NODE

TECHNICAL FIELD

This document relates to locking or loading an object node.

BACKGROUND

Computer systems are configured to include a collection of modules, components or other entities that take part in the operation of the system and that can affect its behavior in one or more ways. Such units can be considered the modules that make up the system and they are often implemented as software components. Software can be written in any of a number of programming languages and is generally used to cause a processor to execute specific instructions. Moreover, a system configured using approaches such as the above can handle one or more objects. An object can correspond to an entity that is relevant to a business process, such as an invoice object or a purchase order object.

Objects can be subject to multiple actions in the processing done by the computer system. For example, objects can be retrieved, manipulated or used for various purposes. Later, the object (in its original or a modified version) can be returned to a storage location, such as a database. A buffer is sometimes implemented for temporarily holding information from a database. This can reduce the demands on the database and/or make them more manageable. As another example, the buffer can provide faster access to an object by an application or other module that needs it.

SUMMARY

The invention relates to locking or loading an object node.

In a first aspect, a computer-implemented method of controlling locking of an object node includes receiving identification of an object that includes a plurality of nodes. The object is modeled to provide for association of any of the plurality of nodes into a lock group such that nodes of the lock group are locked together. The method includes receiving identification of a first group of the nodes to form the lock group. The method includes storing the object with the first group of the nodes forming the lock group.

Implementations can include any, all or none of the following features. The method can further include receiving a request to lock at least a first node of the first group, determining in response to the request to lock that the first node is part of the lock group, and locking the first group of the nodes in response to the determination. The method can further include receiving a request to unlock at least a second node of the first group, determining in response to the request to unlock that the second node is part of the lock group, and unlocking the first group of the nodes in response to the determination. The request to lock can be received from an application configured to use the object. The object can also be modeled to provide for association of any of the plurality of nodes into a load group such that nodes of the load group are loaded together. The method can further include receiving identification of a second group of the nodes to form the load group, and storing the object with the second group of the nodes forming the load group. The object can be modeled to ensure that the second group includes at most as many of the plurality of nodes as the first group.

In a second aspect, a computer program product is tangibly embodied in an information carrier and includes instructions that when executed by a processor perform a method for controlling locking of an object node. The method includes receiving identification of an object that includes a plurality of nodes. The object is modeled to provide for association of any of the plurality of nodes into a lock group such that nodes of the lock group are locked together. The method includes receiving identification of a first group of the nodes to form the lock group. The method includes storing the object with the first group of the nodes forming the lock group.

In a third aspect, a computer-implemented method for controlling loading of an object node includes receiving identification of an object that includes a plurality of nodes. The object is modeled to provide for association of any of the plurality of nodes into a load group such that nodes of the load group are loaded together. The method includes receiving identification of a first group of the nodes to form the load group. The method includes storing the object with the first group of the nodes forming the load group.

Implementations can include any, all or none of the following features. The method can further include receiving a request to load at least a first node of the first group, determining in response to the request to load that the first node is part of the load group, and loading the first group of the nodes in response to the determination. The first group can be loaded into a buffer from a repository where the object is stored. The request to load can be received from an application configured to use the object. The object can also be modeled to provide for association of any of the plurality of nodes into a lock group such that nodes of the load group are locked together. The method can further include receiving identification of a second group of the nodes to form the lock group, and storing the object with the second group of the nodes forming the lock group. The object can be modeled to ensure that the first group includes at most as many of the plurality of nodes as the second group.

In a fourth aspect, a computer program product is tangibly embodied in an information carrier and includes instructions that when executed by a processor perform a method for controlling loading of an object node. The method includes receiving identification of an object that includes a plurality of nodes. The object is modeled to provide for association of any of the plurality of nodes into a load group such that nodes of the load group are loaded together. The method includes receiving identification of a first group of the nodes to form the load group. The method includes storing the object with the first group of the nodes forming the load group.

Implementations can include any, all or none of the following advantages: providing improved management of object locking and/or loading; providing that locking and/or loading is performed according to business concerns; and providing improved configuration and use of a buffer; providing automatic and generic read buffer management by modeling lock and load groups; minimizing or reducing database access while assuring that the buffer always contains current data; and/or eliminating or reducing cache refresh problems in multi-session environments.

The details of one or more embodiments of the invention are set forth in the accompanying drawings and the description below. Other features and advantages will be apparent from the description and drawings, and from the claims.

DESCRIPTION OF DRAWINGS

Like reference symbols in the various drawings indicate like elements.

DETAILED DESCRIPTION

Figure 1:
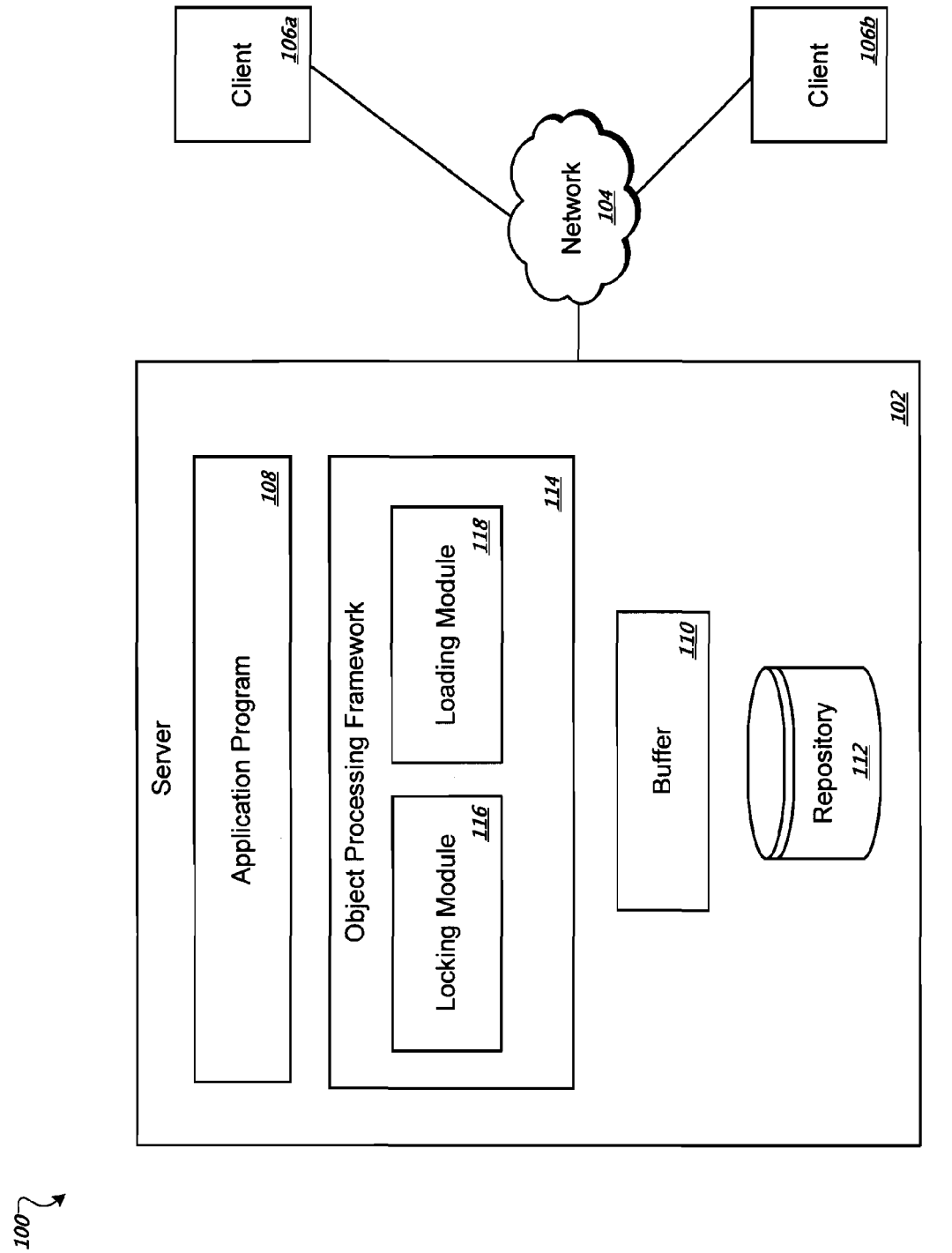
FIG. 1 is a block diagram of a computing system.

FIG. 1 is a block diagram of a computing system 100. The system 100 includes at least one server 102, which is connected to a network 104. The network 104 can be the Internet, a local area network (LAN), a wide area network (WAN) or some other type of network, to name a few examples. One or more client computer devices 106a and 106b can communicate with the server 102 across the network 104. For example, the client computing device 106a can send a request message across the network 104 to the server 102, requesting that the server 102 perform a service that a user of the client computing device 106a is interested in. The server 102 can perform the requested service and for example send a response message across the network 104 to the client computing device 106a. Other system architectures can be used in other implementations, including some that do not have a client-server configuration.

The server 102 can implement the services it offers using one or more objects. An object can represent an entity, service or other concept in a particular business context. For example, an object can represent an entity involved in a business collaboration process, such as a sales order, a product, or an advertising campaign. In implementations using an object-oriented programming (OOP) approach, objects can be grouped into categories, which are referred to as classes, based on the concept they represent. For example, all sales order objects can be grouped into a sales order class, and all advertising campaign objects can be grouped into an advertising campaign class. As another example, a sales order class can define "place order", "change order", and "cancel order" methods that can be used with sales order instances. In some implementations, non-OOP objects can be used. One or more application programs 108 can access object instances and/or call their methods.

An object instance can have one or more characteristics, referred to as attributes, that can store information related to the instance. For example, a sales order instance can have attributes such as an order date and an order total. As another example, an advertising campaign can have begin date and end date attributes. Object attributes can be loaded into a buffer, such as the buffer 110. The buffer 110 can be a memory area which is configured to hold object data that has been loaded from a repository where objects are stored. For example, object data can be loaded into the buffer 110 from a repository 112. The repository 112 can be a database or file, to name a few examples.

In a system such as the system 100, one or more applications can simultaneously attempt to access an object instance. For example, the application program 108 can be accessing an object, and another application program, such as an application program running on the client computing device 106a or another application running on the server 102, can request access to the same object before the application program 108 is finished accessing the object. For example, in a multi-processing system, multiple threads of execution can share the same processor. One thread of execution associated with the application program 108 can be "swapped out" of the processor when a thread of execution associated with another application is given a share of the processor time. In other implementations, multiple processors can be used, and two or more application programs running on different processors can desire to simultaneously access an object.

To prevent concurrent access to the same object, an application program can request a lock on an object, which can result in dedicated access being granted to the requesting application. Other application programs can be prevented from editing or accessing a locked object.

The server 102 includes an object-processing framework 114. The object-processing framework 114 can be a collection of collaborating code and objects which provide a structure for developing and/or running applications. The object-processing framework 114 here includes common processing functionality that is usable by one or more applications. A developer can use existing code in the object-processing framework 114 to accomplish common tasks and/or the developer can create new objects that are specific to the application being constructed to perform functionality that is not offered in the object-processing framework 114, to name a few examples.

The object-processing framework 114 includes a locking module 116. The locking module 116 can provide services for locking and unlocking objects. For example, the application program 108 can submit lock and unlock requests to the locking module 116. Other modules in the object-processing framework 114 can submit lock and unlock requests to the locking module 116, as another example.

The locking module 116 can provide one or more different types of locks. For example, the locking module 116 can grant shared locks and exclusive locks. A shared lock can allow one requestor exclusive write (e.g. allow modification) access to an object and other requestors can be allowed to read an object, but not modify attributes. An exclusive lock can allow one requestor exclusive read and modify access and can deny both modify and read access to other requesters.

The object-processing framework 114 includes a loading module 118. The loading module 118 can provide services for loading objects. For example, the loading module 118 can load object attribute data into the buffer 110 from the repository 112. For example, the application program 108 can submit load requests to the loading module 118. Other modules in the object-processing framework 114 can submit load requests to the loading module 118, as another example. The loading module 118 can provide functionality to synchronize object data stored in the buffer 110 and the repository 112.

Figure 2:
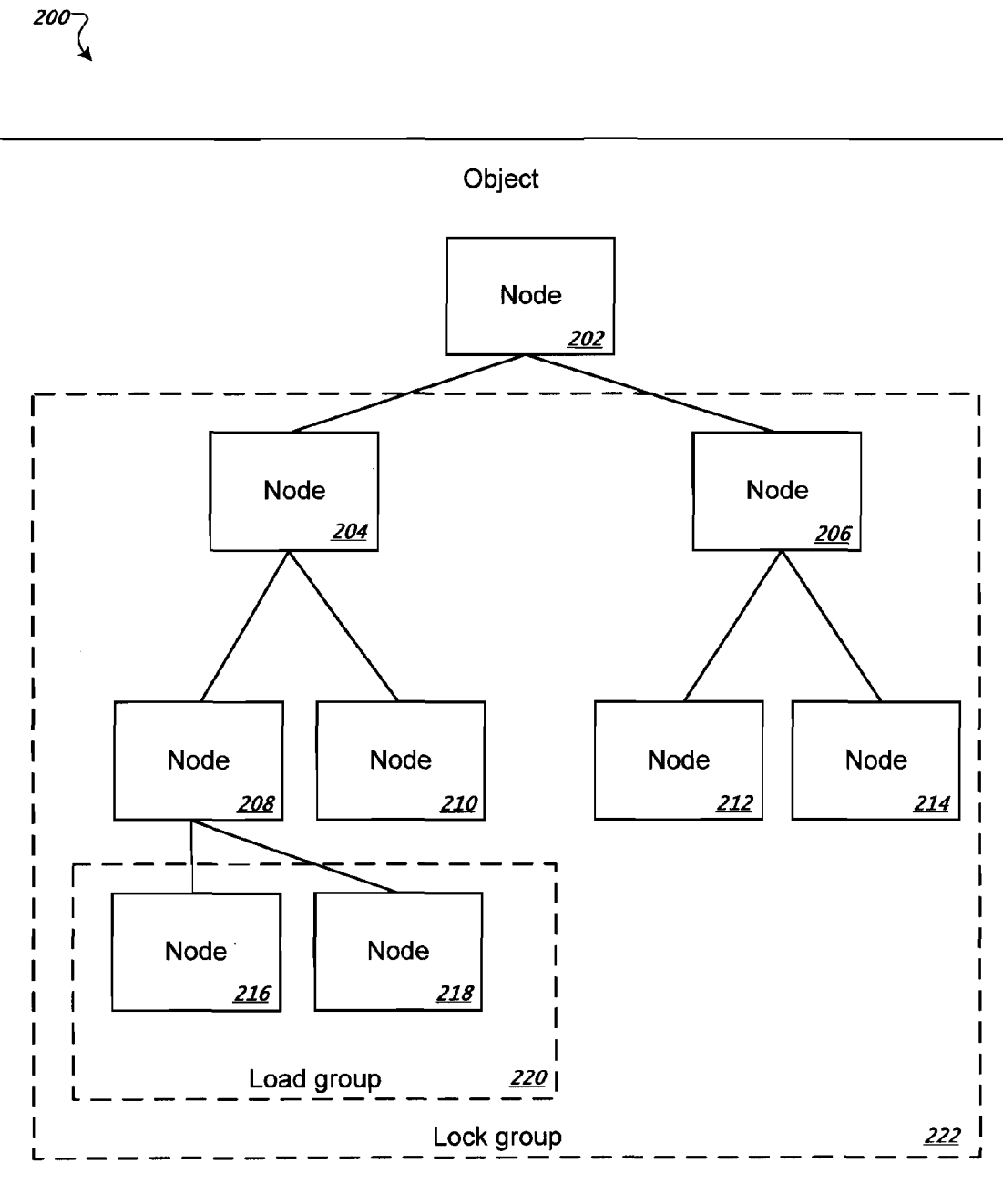
FIG. 2 is an illustration of the structure of an object.

FIG. 2 is an illustration of the structure of an exemplary object 200. The object 200 here includes a set of nodes. A node is a group of one or more attributes of an object. For example, for an object representing an item ordered on a sales order, a node can include attributes corresponding to an item name, item number, item description, unit cost, and quantity ordered. Other information or data can be represented by a node in another example An object can have zero or more nodes. The object 200 includes nine nodes 202-218. Nodes can be organized in a hierarchical structure, as shown in FIG. 2 or in any other non-hierarchical structure.

The object 200 can be modeled to provide for association of one or more nodes into a lock group. Nodes of a lock group can be locked and unlocked together upon a request to lock or unlock one of the nodes in the group. For example, nodes of a lock group can be locked and unlocked by the locking module 116. An object can have zero or more lock groups.

For example, the object 200 here includes a load group 220 which includes nodes 216 and 218. If one of the nodes in the load group 220 is requested to be loaded from the repository 112, such as by the loading module 118, all attributes of the node 216 as well as all attributes of the node 218 can be loaded together. This can provide the advantage that the load is applied to all nodes that should be covered by the load from a business perspective, also if the load request only specifies one or some of the nodes.

As another example, the object 200 can be modeled to provide for association of one or more nodes into a lock group. Nodes of a lock group can be locked or unlocked upon a request to lock or unlock one of the nodes in the group. For example, nodes of a lock group can be locked by the locking module 116. An object can have zero or more load groups.

For example, the object 200 here includes a lock group 222 which includes nodes 204-218. The attributes in nodes 204-218 can be locked by the locking module 116. If one of the nodes in the lock group 222 is requested to be locked, such as by the locking module 116, all nodes in the lock group 222 can be locked. This can provide the advantage that all nodes that should be locked from a business perspective are locked, also if the lock request only specifies one or some of the nodes.

As illustrated in FIG. 2, an object can simultaneously have one or more load groups and one or more lock groups. A node can be in both a load group and a lock group. For example, nodes 216 and 218 are in both the load group 220 and the lock group 222.

In some implementations, load groups are restricted to the same size as, or smaller than, a lock group. Assume, for example, that some part of an object is locked (all elements/nodes of a lock group) and the content of the read buffer (e.g., a cache) needs to be refreshed. In such a situation, the refresh can only be performed at the granularity of the load group. In other implementations, a load group and/or a lock group can have any granularity.

Either or both of the load group 220 and the lock group 222 can be the direct result of user input. That is, in some implementations a user can access a suitable user interface and there identify those of an object's nodes, if any, that should be grouped for locking and/or loading purposes. For example, the locking module 116 or the loading module 118 can provide such an interface. As another example, a program or other process (e.g., in the system 100) can provide input to the locking module 116 and/or the loading module 118 to identify the relevant node(s). In any event, the locking module 116 and/or the loading module 118 can then make the necessary updates to ensure that the lock/load group is established. This can involve modifying the object instance itself or by storing a configuration for the buffer 110, or updating a record in the modules 116 or 118, to name a few examples.

The following are more specific examples of locking or loading. Beginning with the former, a request can be received to lock a node. For example, the application program 108 (FIG. 1) can submit a request to the locking module 116 to lock node 216 of the object 200. The locking module 116 can determine whether the node to be locked is part of a lock group. For example, the locking module 116 can determine that the node 216 is part of the lock group 222.

Upon the locking module 116 determining that the node to be locked is in a lock group, the lock group can be locked. For example, the locking module 116 can lock the lock group 222 based on its determination in response to a request to lock the node 216. All nodes in the lock group can be locked simultaneously (e.g., nodes 216 and 218 of the lock group 222 can be locked simultaneously) or in sequence.

If, in contrast, the locking module 116 determines that the node requested to be locked is not part of a lock group, the locking module 116 can lock the node individually. For example, if the locking module 116 receives a request to lock node 204 of the object 200 (where node 204 is currently unlocked and not part of a lock group), the locking module 116 can determine that the node 204 is not part of a lock group and the node 204 can be locked individually.

If a request is received to lock a node that is part of a lock group that is currently locked, the locking module 116 can ignore the lock request. As another example, the locking module 116 can report an error condition to the requester if a request to lock a node included in a locked lock group is received. For example, if the lock group 222 is currently locked, and the application program 108 requests a lock on node 216 of the object 200, the locking module 116 can ignore the lock request (i.e., take no action), communicate an error condition to the application program 108, or take some other action.

Continuing the present example, a request can be received to unlock a node. For example, the application program 108 can submit a request to the locking module 116 to unlock node 218 of the object 200. The locking module 116 can determine if the node to be unlocked is part of a lock group. For example, the locking module 116 can determine that the node 218 is part of the lock group 222.

If the locking module 116 determines that the node to be unlocked is in a lock group, the lock group can be unlocked. All nodes of the lock group can be unlocked together. For example, the locking module 116 can unlock the lock group 222 (resulting in the unlocking of nodes 204-218) in response to a request to unlock the node 218. If the locking module 116 determines that the node requested to be unlocked is not part of a lock group, the locking module 116 can unlock the node individually. For example, if the locking module 116 receives a request to unlock node 204 of the object 200 (where node 204 is locked but not part of a lock group), the locking module 116 can determine that the node 204 is not part of a lock group and the node 204 can be unlocked individually.

If a request is received to unlock a node that is part of a lock group that is not currently locked, the locking module 116 can ignore the unlock request. As another example, the locking module 116 can report an error condition to the requestor if a request to unlock a node included in an unlocked lock group is received. For example, if the lock group 222 is currently unlocked, and the application program 108 requests to unlock node 216 of the object 200, the locking module 116 can ignore the unlock request (i.e., take no action), communicate an error condition to the application program 108, or take some other action.

Turning now to the second detailed example, a request can be received to load a node. For example, the application program 108 can submit a request to the loading module 118 to load node 216 of the object 200 from the repository 112. The loading module 118 can determine whether the node to be loaded is part of a load group. For example, the loading module can determine that the node 216 is part of the load group 220, and in response to the determination, the loading module 118 can load the load group 220. All nodes of the load group (e.g., nodes 216 and 218) can be loaded together.

If a request is received to load a node that is not part of a load group, the node can be loaded individually. For example, if the loading module 112 receives a request to load node 202 of the object 200 (where node 202 is currently not part of a load group), the loading module can determine that the node 202 is not part of a load group and the node 202 can be loaded individually.

Figure 3:
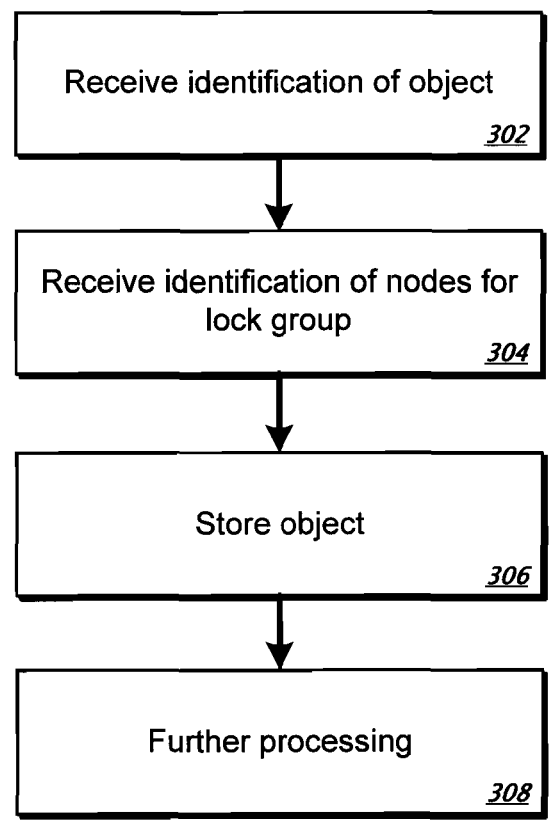
FIG. 3 is a flowchart of a method for defining a lock group.

FIG. 3 is a flowchart of a method 300 for defining a lock group. The method 300 can be performed by a processor executing instructions stored in a computer-readable medium. For example, the object may have been modeled (in the system 100 or elsewhere) to provide for one or more lock groups to be defined. Moreover, a customer or consultant (for example) can configure the object instance by defining which of the object nodes, if any, should be included in a lock group.

In step 302, identification of an object is received. The object includes a plurality of nodes and the object is modeled to provide for association of any of the plurality of nodes into a lock group such that nodes of the lock group are locked together. For example, the locking module 116 can receive identification of the object 200, where the object 200 has a set of nodes 202-218.

In step 304, identification of a first group of nodes to form a lock group is received. For example, the locking module 116 can receive an identification of the nodes 204-218 of the object 200, to form the lock group 222.

In step 306, the object is stored. For example, the object 200 can be stored in the repository 112. Information identifying the association of nodes 204-218 into the lock group 222 can be part of the information that is stored for the object 200, such that when the object 200 is subsequently loaded, the lock group 222 can be identified. If the object to be stored has one or more load groups, information associated with the load groups can also be stored.

In step 308, further processing is performed. For example, requests can be received to lock a node of a lock group, such as a request to lock node 216 included in the lock group 220. As another example, requests can be received to unlock a node of a lock group (e.g., a request to unlock node 218 included in the lock group 222).

Figure 4:
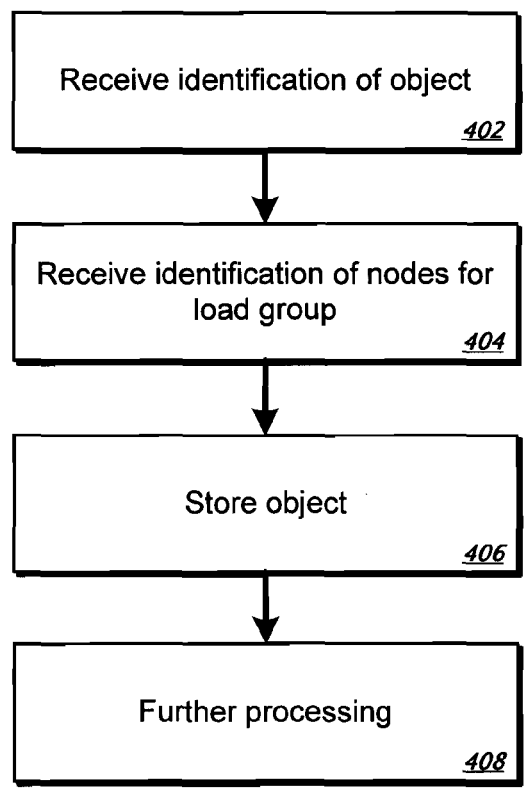
FIG. 4 is a flowchart of a method for defining a load group.

FIG. 4 is a flowchart of a method 400 for defining a load group. The method 400 can be performed by a processor executing instructions stored in a computer-readable medium. For example, the object may have been modeled (in the system 100 or elsewhere) to provide for one or more load groups to be defined. Moreover, a customer or consultant (for example) can configure the object instance by defining which of the object nodes, if any, should be included in a load group.

In step 402, identification of an object is received. The object includes a plurality of nodes and the object is modeled to provide for association of any of the plurality of nodes into a load group such that nodes of the load group are loaded together. For example, the loading module 118 can receive identification of the object 200, where the object 200 has a set of nodes 202-218.

In step 404, identification of a first group of nodes to form a load group is received. For example, the loading module 118 can receive an identification of the nodes 216 and 218 of the object 200, to form the load group 220.

In step 406, the object is stored. For example, the object 200 can be stored in the repository 112. Information identifying the association of nodes 216 and 218 into the load group 220 can be part of the information that is stored for the object 200. If the object to be stored has one or more lock groups, information associated with the lock groups can also be stored.

In step 408, further processing is performed. For example, requests can be received to load a node of a load group, such as a request to load node 216 included in the load group 220.

Figure 5:
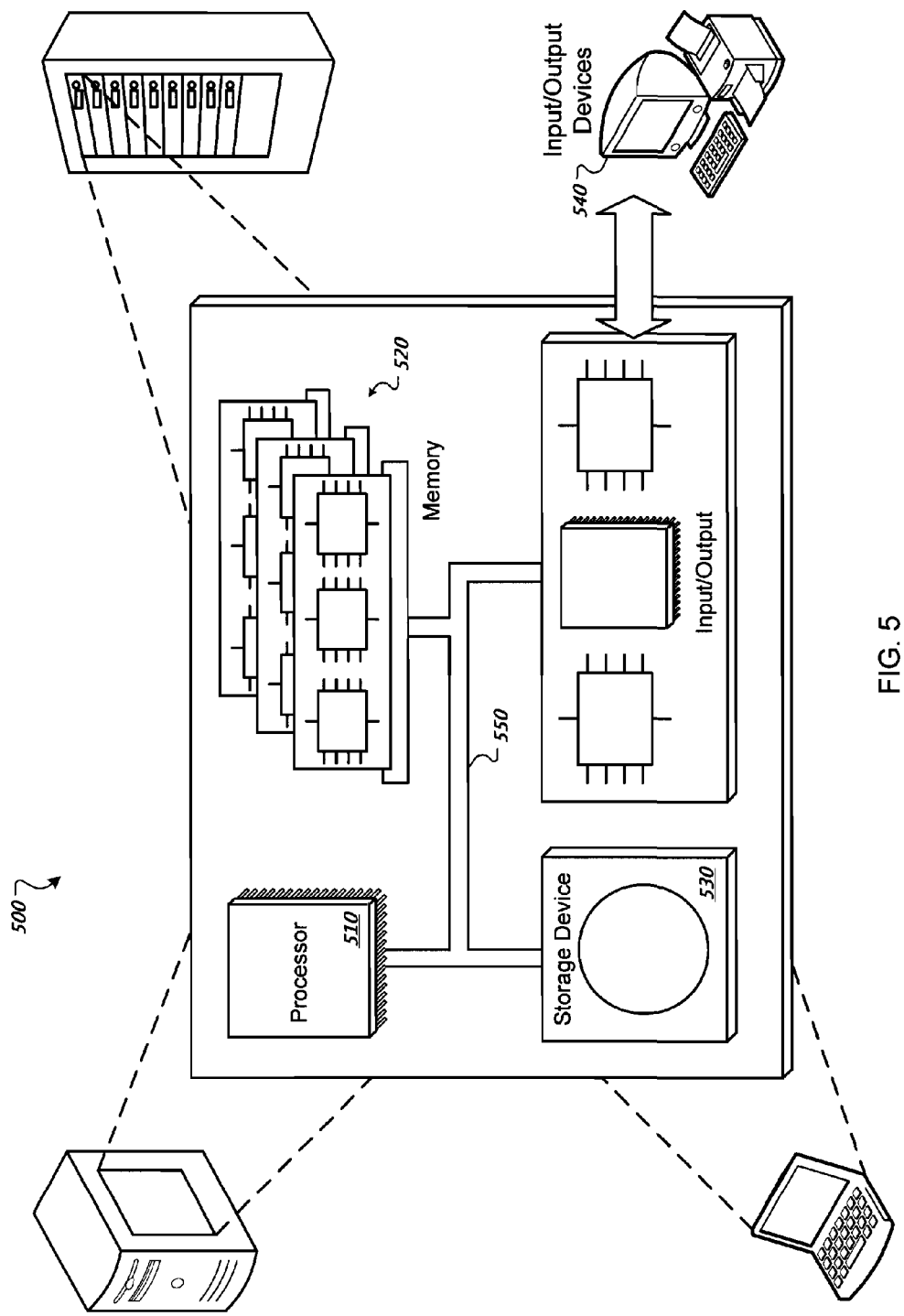
FIG. 5 is a block diagram of a computing system that can be used in connection with computer-implemented methods described in this document.

FIG. 5 is a schematic diagram of a generic computer system 500. The system 500 can be used for the operations described in association with any of the computer-implement methods described previously, according to one implementation. The system 500 includes a processor 510, a memory 520, a storage device 530, and an input/output device 540. Each of the components 510, 520, 530, and 540 are interconnected using a system bus 550. The processor 510 is capable of processing instructions for execution within the system 500. In one implementation, the processor 510 is a single-threaded processor. In another implementation, the processor 510 is a multi-threaded processor. The processor 510 is capable of processing instructions stored in the memory 520 or on the storage device 530 to display graphical information for a user interface on the input/output device 540.

The memory 520 stores information within the system 500. In one implementation, the memory 520 is a computer-readable medium. In one implementation, the memory 520 is a volatile memory unit. In another implementation, the memory 520 is a non-volatile memory unit.

The storage device 530 is capable of providing mass storage for the system 500. In one implementation, the storage device 530 is a computer-readable medium. In various different implementations, the storage device 530 may be a floppy disk device, a hard disk device, an optical disk device, or a tape device.

The input/output device 540 provides input/output operations for the system 500. In one implementation, the input/output device 540 includes a keyboard and/or pointing device. In another implementation, the input/output device 540 includes a display unit for displaying graphical user interfaces.

The features described can be implemented in digital electronic circuitry, or in computer hardware, firmware, software, or in combinations of them. The apparatus can be implemented in a computer program product tangibly embodied in an information carrier, e.g., in a machine-readable storage device, for execution by a programmable processor; and method steps can be performed by a programmable processor executing a program of instructions to perform functions of the described implementations by operating on input data and generating output. The described features can be implemented advantageously in one or more computer programs that are executable on a programmable system including at least one programmable processor coupled to receive data and instructions from, and to transmit data and instructions to, a data storage system, at least one input device, and at least one output device. A computer program is a set of instructions that can be used, directly or indirectly, in a computer to perform a certain activity or bring about a certain result. A computer program can be written in any form of programming language, including compiled or interpreted languages, and it can be deployed in any form, including as a stand-alone program or as a module, component, subroutine, or other unit suitable for use in a computing environment.

Suitable processors for the execution of a program of instructions include, by way of example, both general and special purpose microprocessors, and the sole processor or one of multiple processors of any kind of computer. Generally, a processor will receive instructions and data from a read-only memory or a random access memory or both. The essential elements of a computer are a processor for executing instructions and one or more memories for storing instructions and data. Generally, a computer will also include, or be operatively coupled to communicate with, one or more mass storage devices for storing data files; such devices include magnetic disks, such as internal hard disks and removable disks; magneto-optical disks; and optical disks. Storage devices suitable for tangibly embodying computer program instructions and data include all forms of non-volatile memory, including by way of example semiconductor memory devices, such as EPROM, EEPROM, and flash memory devices; magnetic disks such as internal hard disks and removable disks; magneto-optical disks; and CD-ROM and DVD-ROM disks. The processor and the memory can be supplemented by, or incorporated in, ASICs (application-specific integrated circuits).

To provide for interaction with a user, the features can be implemented on a computer having a display device such as a CRT (cathode ray tube) or LCD (liquid crystal display) monitor for displaying information to the user and a keyboard and a pointing device such as a mouse or a trackball by which the user can provide input to the computer.

The features can be implemented in a computer system that includes a back-end component, such as a data server, or that includes a middleware component, such as an application server or an Internet server, or that includes a front-end component, such as a client computer having a graphical user interface or an Internet browser, or any combination of them. The components of the system can be connected by any form or medium of digital data communication such as a communication network. Examples of communication networks include, e.g., a LAN, a WAN, and the computers and networks forming the Internet.

The computer system can include clients and servers. A client and server are generally remote from each other and typically interact through a network, such as the described one. The relationship of client and server arises by virtue of computer programs running on the respective computers and having a client-server relationship to each other.

A number of embodiments have been described. Nevertheless, it will be understood that various modifications may be made without departing from the spirit and scope of this disclosure. Accordingly, other embodiments are within the scope of the following claims.

What is claimed is:

1. A computer-implemented method for controlling loading of an object node, the method comprising:
   receiving identification at a server system of an object that includes a plurality of nodes, the object modeled to provide for association of any of the plurality of nodes into a load group such that nodes of the load group are loaded together so that a requestor loads all the nodes in the load group from a database and to a memory buffer when a request to load a first node in the load group is received from the requestor, wherein each node in the plurality includes multiple attributes and is stored in the database, the load group defined such that all of the objects assigned to the load group are loaded together in response to receiving a request to load any of the objects assigned to the load group;
   receiving identification at the server system of a first group of the nodes to form the load group; and
   storing the object with the first group of the nodes forming the load group.

2. The computer-implemented method of claim 1, further comprising:
   receiving, from an application program and subsequent to the identification of the object that includes the plurality of nodes, a request to load at least a first node of the first group;
   determining in response to the request to load that the first node is part of the load group; and
   loading the first group of the nodes in response to the determination, the first group of nodes being loaded together from the database to the memory buffer, wherein the loaded nodes are accessible to the application program in the memory buffer.

3. The computer-implemented method of claim 2, wherein the first group is loaded into a buffer from a repository where the object is stored.

4. The computer-implemented method of claim 2, wherein the request to load is received from an application configured to use the object.

5. The computer-implemented method of claim 1, wherein the object is also modeled to provide for association of any of the plurality of nodes into a lock group such that nodes of the lock group are locked together.

6. The computer-implemented method of claim 5, further comprising:
   receiving identification of a second group of the nodes to form the lock group; and
   storing the object with the second group of the nodes forming the lock group.

7. The computer-implemented method of claim 6, wherein the object is modeled to ensure that the first group includes at most as many of the plurality of nodes as the second group.

8. A computer program product tangibly embodied in a machine-readable storage device and comprising instructions that when executed by a processor perform a method for controlling loading of an object node, the method comprising:
   receiving identification at a server system of an object that includes a plurality of nodes, the object modeled to provide for association of any of the plurality of nodes into a load group such that nodes of the load group are loaded together from a database to a memory buffer so that a requestor loads all the nodes in the load group when a request to load a first node in the load group is received from the requestor, wherein each node in the plurality includes multiple attributes and is stored in the database, the load group defined such that all of the objects assigned to the load group are loaded together in response to receiving a request to load any of the objects assigned to the load group;
   receiving identification at the server system of a first group of the nodes to form the load group; and
   storing the object with the first group of the nodes forming the load group.

9. A system comprising:
   at least one programmable processor;
   a computer program product coupled to the at least one programmable processor, tangibly embodied in a machine-readable storage device, and comprising instructions that when executed by the at least one programmable processor perform a method comprising:
   receiving identification at the at least one programmable processor of an object that includes a plurality of nodes, the object modeled to provide for association of any of the plurality of nodes into a load group such that nodes of the load group are loaded together so that a requestor loads all the nodes in the load group from a database and to a memory buffer when a request to load a first node in the load group is received from the requestor, wherein each node in the plurality includes multiple attributes and is stored in the database, the load group defined such that all of the objects assigned to the load group are loaded together in response to receiving a request to load any of the objects assigned to the load group;
   receiving identification at the at least one programmable processor of a first group of the nodes to form the load group; and
   storing the object with the first group of the nodes forming the load group.

10. A computer-implemented method for controlling loading of an object node, the method comprising:
    receiving, at a computing device, identification of a plurality of objects as being assigned to a load group, wherein each object in the plurality includes multiple attributes and is stored in a database, the load group defined such that all of the objects assigned to the load group are loaded together in response to receiving a request to load any of the objects assigned to the load group;

receiving, subsequent to the identification of the plurality of objects and from an application program, a request to load a first object;

determining, in response to receiving the request to load, that the first object is part of the load group; and loading the multiple attributes for each object in the load group, the multiple attributes being loaded together from the database to a memory buffer in response to the determination, wherein the loaded attributes are accessible to the application program in the memory buffer.

11. The computer-implemented method of claim 10, wherein the application program is one of multiple application programs that are able to request loading of objects from the database and able to access the memory buffer.

12. The computer-implemented method of claim 10, wherein the memory buffer provides the application faster access to object attributes than the database.

13. A computer program product tangibly embodied in a machine-readable storage device and comprising instructions that when executed by a processor perform a method for controlling loading of an object node, the method comprising:

receiving, at a computing device, identification of a plurality of objects as being assigned to a load group, wherein each object in the plurality includes multiple attributes and is stored in a database, the load group defined such that all of the objects assigned to the load group are loaded together in response to receiving a request to load any of the objects assigned to the load group;

receiving, subsequent to the identification of the plurality of objects and from an application program, a request to load a first object;

determining, in response to receiving the request to load, that the first object is part of the load group; and loading the multiple attributes for each object in the load group, the multiple attributes being loaded together from the database to a memory buffer in response to the determination, wherein the loaded attributes are accessible to the application program in the memory buffer.

14. The computer program product of claim 13, wherein the application program is one of multiple application programs that are able to request loading of objects from the database and able to access the memory buffer.

15. The computer program product of claim 13, wherein the memory buffer provides the application faster access to object attributes than the database.

16. A system comprising:

at least one programmable processor;

a computer program product coupled to the at least one programmable processor, tangibly embodied in a machine-readable storage device, and comprising instructions that when executed by the at least one programmable processor perform a method comprising:

receiving, at a computing device, identification of a plurality of objects as being assigned to a load group, wherein each object in the plurality includes multiple attributes and is stored in a database, the load group defined such that all of the objects assigned to the load group are loaded together in response to receiving a request to load any of the objects assigned to the load group;

receiving, subsequent to the identification of the plurality of objects and from an application program, a request to load a first object;

determining, in response to receiving the request to load, that the first object is part of the load group; and loading the multiple attributes for each object in the load group, the multiple attributes being loaded together from the database to a memory buffer in response to the determination, wherein the loaded attributes are accessible to the application program in the memory buffer.

17. The system of claim 16, wherein the application program is one of multiple application programs that are able to request loading of objects from the database and able to access the memory buffer.

18. The system of claim 16, wherein the memory buffer provides the application faster access to object attributes than the database.

19. A computer-implemented method for controlling loading of an object node, the method comprising:

receiving identification at a server system of an object that includes a plurality of nodes, the object modeled to provide for association of any of the plurality of nodes into a load group such that nodes of the load group are loaded together so that a requestor loads all the nodes in the load group from a database and to a memory buffer when a request to load a first node in the load group is received from the requestor, wherein each node in the plurality includes multiple attributes and is stored in the database;

wherein the object is also modeled to provide for association of any of the plurality of nodes into a lock group such that nodes of the load group are locked together;

receiving identification at the server system of a first group of the nodes to form the load group;

storing the object with the first group of the nodes forming the load group;

receiving identification of a second group of the nodes to form the lock group; and storing the object with the second group of the nodes forming the lock group, wherein the object is modeled to ensure that the first group includes at most as many of the plurality of nodes as the second group.

* * * * *

UNITED STATES PATENT AND TRADEMARK OFFICE
CERTIFICATE OF CORRECTION

| | | |
|---|---|---|
| PATENT NO. | : 8,914,565 B2 | Page 1 of 1 |
| APPLICATION NO. | : 11/760223 | |
| DATED | : December 16, 2014 | |
| INVENTOR(S) | : Zoch et al. | |

It is certified that error appears in the above-identified patent and that said Letters Patent is hereby corrected as shown below:

On the title page item (73), delete "SAP AG" and insert -- SAP SE --, therefor.

Signed and Sealed this
Fifteenth Day of September, 2015

Michelle K. Lee
*Director of the United States Patent and Trademark Office*